(12) United States Patent
Cope

(10) Patent No.: US 7,196,276 B1
(45) Date of Patent: Mar. 27, 2007

(54) TRUCK MOUNTED SCALE APPARATUS

(75) Inventor: Benjamin W. Cope, Lancaster, PA (US)

(73) Assignee: The Cope Company Salt, Lancaster, PA (US)

( * ) Notice: Subject to any disclaimer, the term of this patent is extended or adjusted under 35 U.S.C. 154(b) by 259 days.

(21) Appl. No.: 10/931,739

(22) Filed: Sep. 1, 2004

Related U.S. Application Data

(63) Continuation-in-part of application No. 10/896,211, filed on Jul. 21, 2004.

(51) Int. Cl.
*G01G 19/08* (2006.01)
(52) U.S. Cl. ..................... 177/116; 177/136
(58) Field of Classification Search ........ 177/136–139, 177/116–121
See application file for complete search history.

(56) References Cited

U.S. PATENT DOCUMENTS

| | | | | |
|---|---|---|---|---|
| 2,793,024 A | * | 5/1957 | Rose et al. ................ | 177/136 |
| 3,065,808 A | * | 11/1962 | Dodgen ...................... | 177/151 |
| 3,565,288 A | * | 2/1971 | Shute ......................... | 222/55 |
| 5,880,407 A | * | 3/1999 | Flammang .................. | 177/116 |
| 5,979,703 A | * | 11/1999 | Nystrom ..................... | 222/58 |
| 6,396,003 B1 | * | 5/2002 | Friesen ....................... | 177/136 |

* cited by examiner

*Primary Examiner*—Randy W. Gibson
(74) *Attorney, Agent, or Firm*—Miller Law Group, PLLC

(57) ABSTRACT

A truck-mounted scale mechanism can provide an accurate measurement of the weight of loose material dispensed from a delivery truck. The scale mechanism is supported on the tailgate of the delivery truck for transport from one job site to another. A winch provides a mechanism for deploying the scale mechanism from the transport position. The scale includes a frame mechanism pivotally supporting a hopper having a gate-controlled discharge chute operated by an air cylinder with weigh cells being located between the hopper and the frame. A computer on the scale mechanism operatively controls the air cylinder controlling the gate on the delivery chute of the truck bed and the air cylinder controlling the discharge chute gate on the hopper such that the loading, weighing and dispensing of the loose salt from the truck bed to the customer storage facility is automated until the system is halted by the operator.

21 Claims, 9 Drawing Sheets

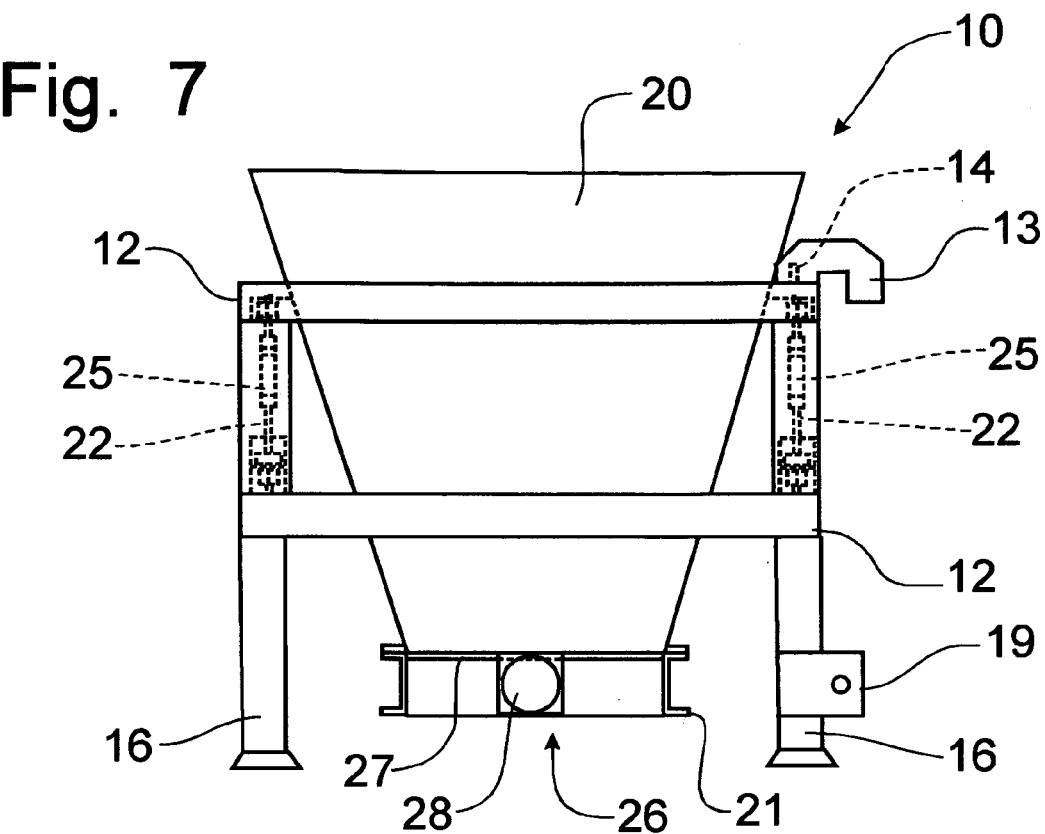

TRUCK MOUNTED SCALE APPARATUS

CROSS-REFERENCE TO RELATED APPLICATIONS

This application is a continuation-in-part of co-pending U.S. patent application Ser. No. 10/896,211, filed Jul. 21, 2004, the contents of which are incorporated herein by reference.

BACKGROUND OF THE INVENTION

The present invention relates generally to a scale for weighing bulk material being delivered to a consumer and, more particularly, to a scale that can be mounted on the rear of a truck that delivers the bulk material to the consumer.

The delivery of loose material, such as loose salt, to consumers need to be weighed before delivery so that the consumer is charged for the appropriate amount of material being delivered for consumption. Weighing the loose material can be accomplished in a number of different ways, most typically by weighing the truck and contents before and after delivery of the loose material to register the difference which would correspond to the amount of material being delivered. Alternatively, the loose material can be independently weighed before placement into the truck for delivery.

Absent individual storage compartments within the delivery truck to store pre-measured discrete quantities of the loose material, the above-described methods of weighing the loose material are not conducive to making multiple deliveries with a single truck load of loose material. Certification of scales that are mounted on trucks for use in measuring the weight of loose material being dispensed is, at best, difficult to obtain. Without proper leveling and zeroing of the scale, accurate weight measurements cannot be obtained.

Furthermore, the dispensing of loose material at a consumers place of business needs to be accomplished as quickly as possible so as not to disrupt the customer's business or obstruct the place of business. No known scale mechanism that would be suitable for use in measuring the weight of loose material being dispensed would be capable of quickly weighing and then dispensing the loose material.

Accordingly, it would be desirable to provide a scale mechanism that could be mounted on a truck for delivering loose material to a consumer's place of business and used to weigh and quickly dispense loose material being dispensed from the delivery truck.

SUMMARY OF THE INVENTION

It is an object of this invention to overcome the aforementioned disadvantages of the known prior art systems by providing a truck-mounted scale for use in weighing and dispensing loose material.

It is another object of this invention to provide a truck-mounted scale that will quickly weigh and dispense loose material.

It is still another object of this invention to provide a scale mechanism that can be carried by a delivery truck from job site to job site and used to provide an accurate measurement of the loose material being dispensed.

It is a feature of this invention that the scale mechanism is carried on the chassis of the delivery truck so that it can be used at multiple job sites during each delivery route of the truck.

It is an advantage of this invention that the scale mechanism can be leveled before utilization to provide accurate measurements of the weight of loose material being dispensed.

It is another feature of this invention that the hopper of the scale mechanism is pivotally supported on a frame apparatus to permit a leveling of the hopper before being utilized.

It is still another feature of this invention that weigh cells are disposed between the hopper and the frame apparatus to weigh the loose material being dispensed into the hopper from the delivery truck.

It is another advantage of this invention that the frame apparatus can be positioned on a slight incline rearward of the delivery truck while the hopper seeks a level orientation due to the pivotal support between the hopper and the frame apparatus.

It is still another feature of this invention that the movement of the gate on the delivery chute of the delivery truck is controlled by a linear actuator.

It is yet another feature of this invention that the movement of the gate controlling the discharge opening of the hopper of the scale mechanism is operated by a linear actuator.

It is still another feature of this invention that the linear actuator for the truck delivery chute and the linear actuator for the hopper discharge chute are operatively coordinated by a computer utilized by the scale mechanism.

It is yet another advantage of this invention that the delivery of loose material into the hopper to be weighed and then the discharge of the loose material into the customer's storage facility can be rapidly coordinated to accurately weigh and deliver loose material to the customer's storage facility in a rapid manner.

It is yet another object of this invention to provide a method of dispensing loose salt to customer's storage facilities in which the amount of salt dispensed is accurately weighed before being discharged into the storage facility.

It is a further feature of this invention that the method of dispensing salt is automated from the initiation of the process to the halting of the process when the storage facility is filled.

It is a further feature of this invention that the scale mechanism is mountable on the tailgate of a delivery truck for transport from one job location to another.

It is yet another object of this invention to provide a truck-mounted scale for use in the delivery of loose salt to commercial and industrial customers that is inexpensive in use, carefree of maintenance, lower cost to operate, conducive to establishing franchise operations, and simple and effective in utilization.

These and other objects, features and advantages are accomplished according to the instant invention by providing a truck-mounted scale mechanism that can provide an accurate measurement of the weight of salt or other loose material dispensed from a delivery truck. The scale mechanism is supported on the tailgate of the delivery truck for transport from one job site to another. A winch provides a mechanism for deploying the scale mechanism from the transport position. The scale includes a frame mechanism pivotally supporting a hopper having a gate-controlled discharge chute operated by an air cylinder. A computer on the scale mechanism operatively controls the air cylinder controlling the gate on the delivery chute of the truck bed and the air cylinder controlling the discharge chute gate on the hopper such that the loading, weighing and dispensing of the loose salt from the truck bed to the customer storage facility is automated until the system is halted by the operator.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 7 is a right side elevational view of the scale mechanism depicted in FIGS. 5 and 6;

FIG. 8 is a left elevational view of the scale mechanism depicted in FIG. 7;

DETAILED DESCRIPTION OF THE PREFERRED EMBODIMENT

Figure 1:
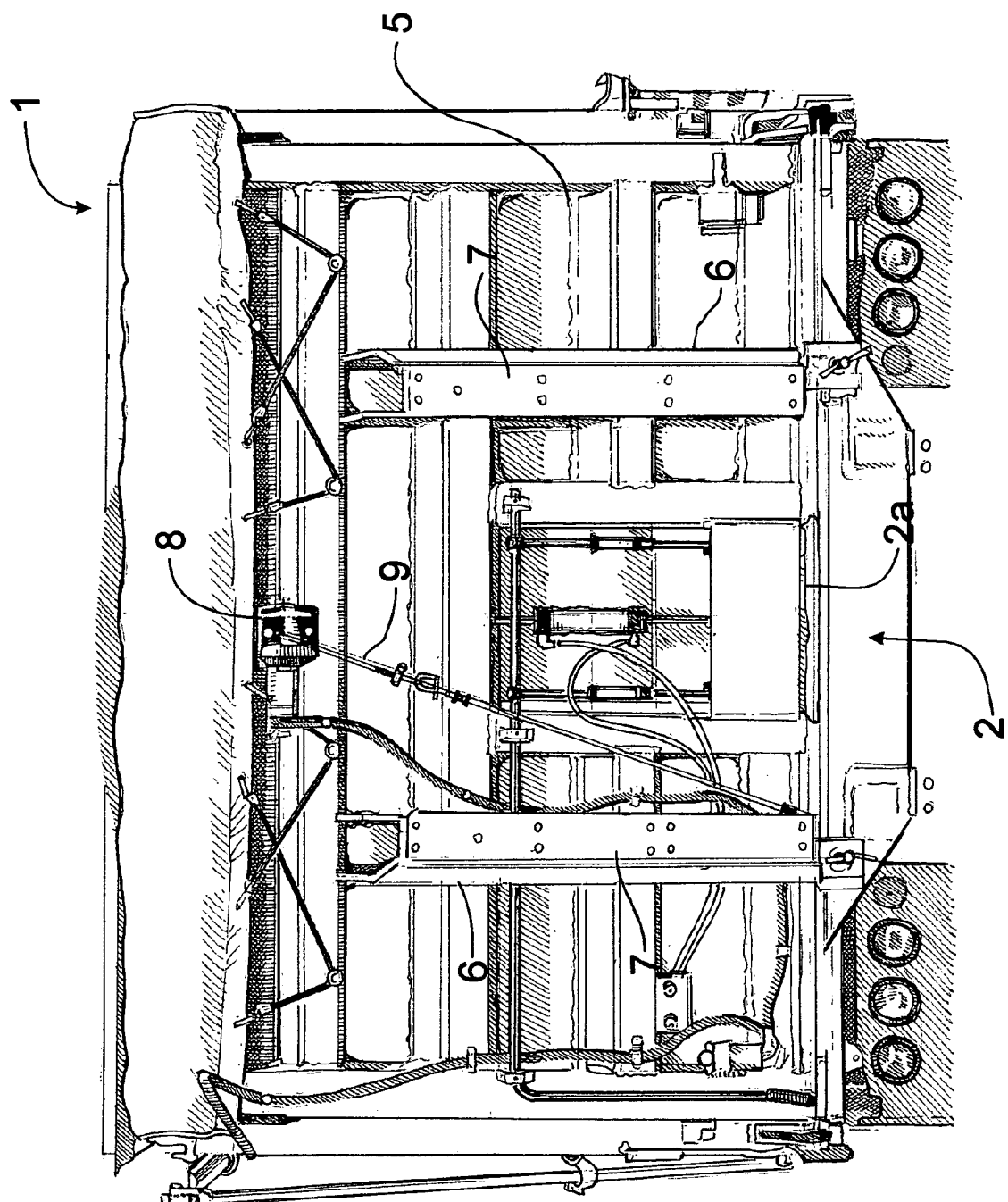
FIG. 1 is a rear elevational view of a large delivery truck adapted for mounting a scale mechanism incorporating the principles of the instant invention.

Referring to FIGS. 1–10, a scale mechanism incorporating the principles of the instant invention can best be seen. The scale mechanism 10 is adapted to be mounted on the tailgate 5 of a large delivery truck 1 to permit the transport of the scale mechanism 10 from one job location to another. This scale mechanism 10 is particularly adapted for the delivery of loose salt to underground, or below grade, storage facilities, at the customer's place of business, such as are described in Applicant's co-pending patent application Ser. No. 10/896,211.

The scale mechanism 10 includes an external frame apparatus 12 that pivotally supports a hopper 20, as will be described in greater detail below, and include hook members 13 that are positioned to engage channels 6 formed on the truck tailgate 5, thus physically supporting the frame apparatus 12 in an elevated position for transport with the truck 1. The channels 6 are preferably provided on the rear exterior surface thereof with an anti-friction material 7, such as a plastic phenolic material, to facilitate the movement of the frame apparatus 12 and the hook members 13 over the tailgate 5, as will be described in greater detail below. The tailgate 5 further includes an electric winch 8 having a cable 9 that is connectable to a support member 14 mounted on the frame apparatus 12 between the transversely spaced hook members 13.

Figure 2:
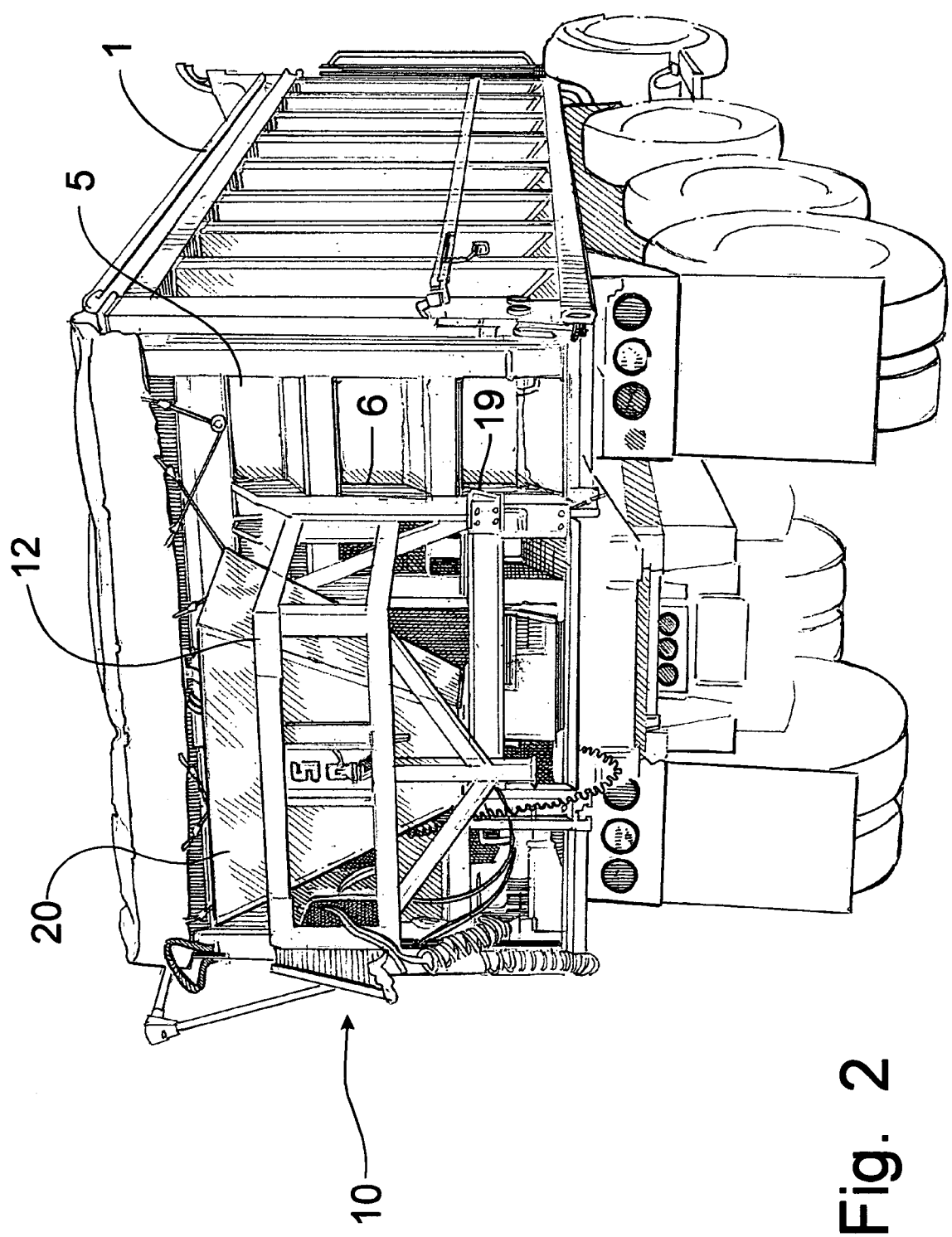
FIG. 2 is a right, rear perspective view of a large salt delivery truck having a scale mechanism incorporating the principles of the instant invention mounted on the tailgate thereof in a transport position.
Figure 3:
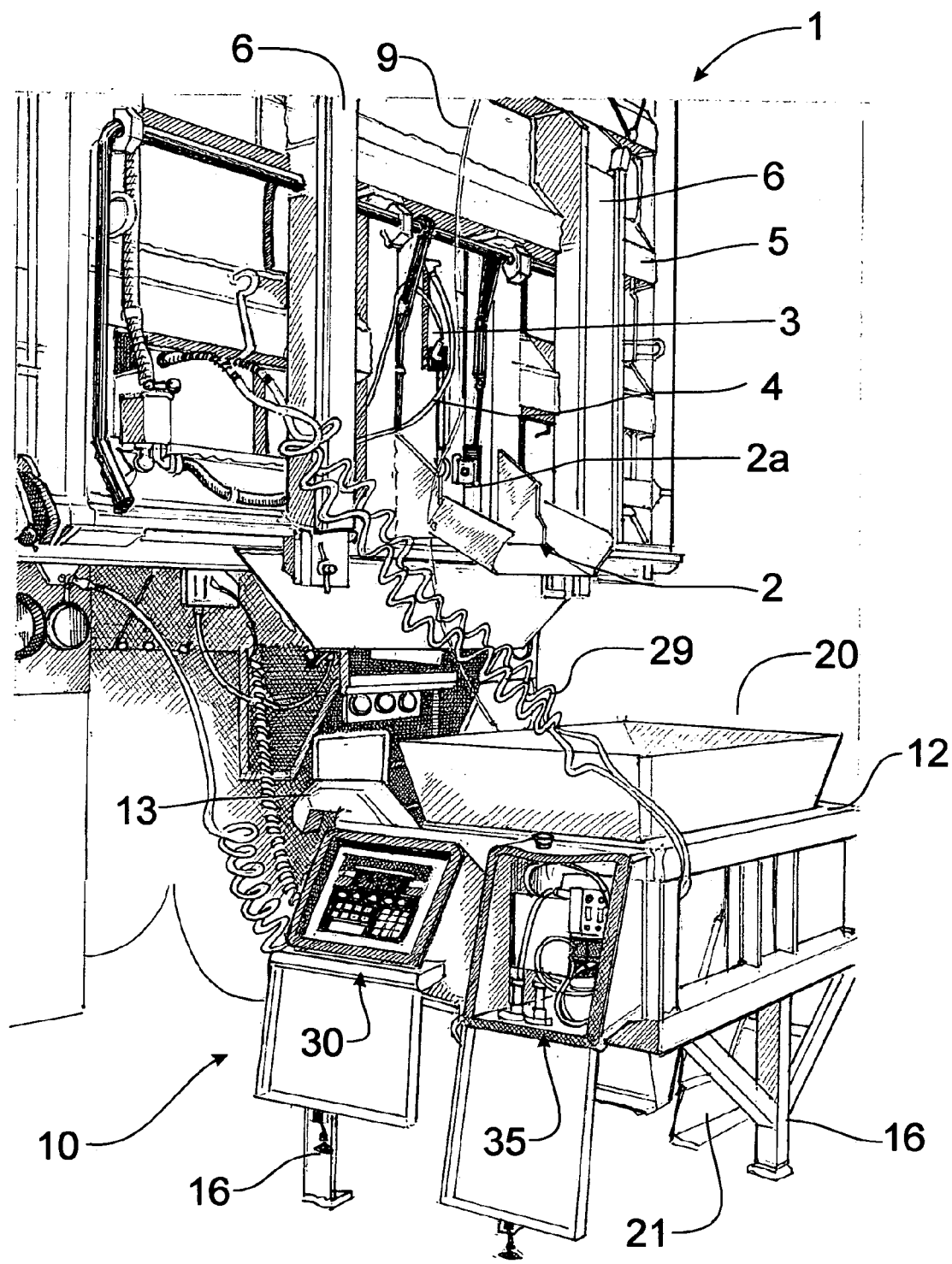
FIG. 3 is a left, rear perspective view of the delivery truck of FIG. 1, but having the scale mechanism positioned on the surface of the ground rearwardly of the truck for operation.
Figure 4:
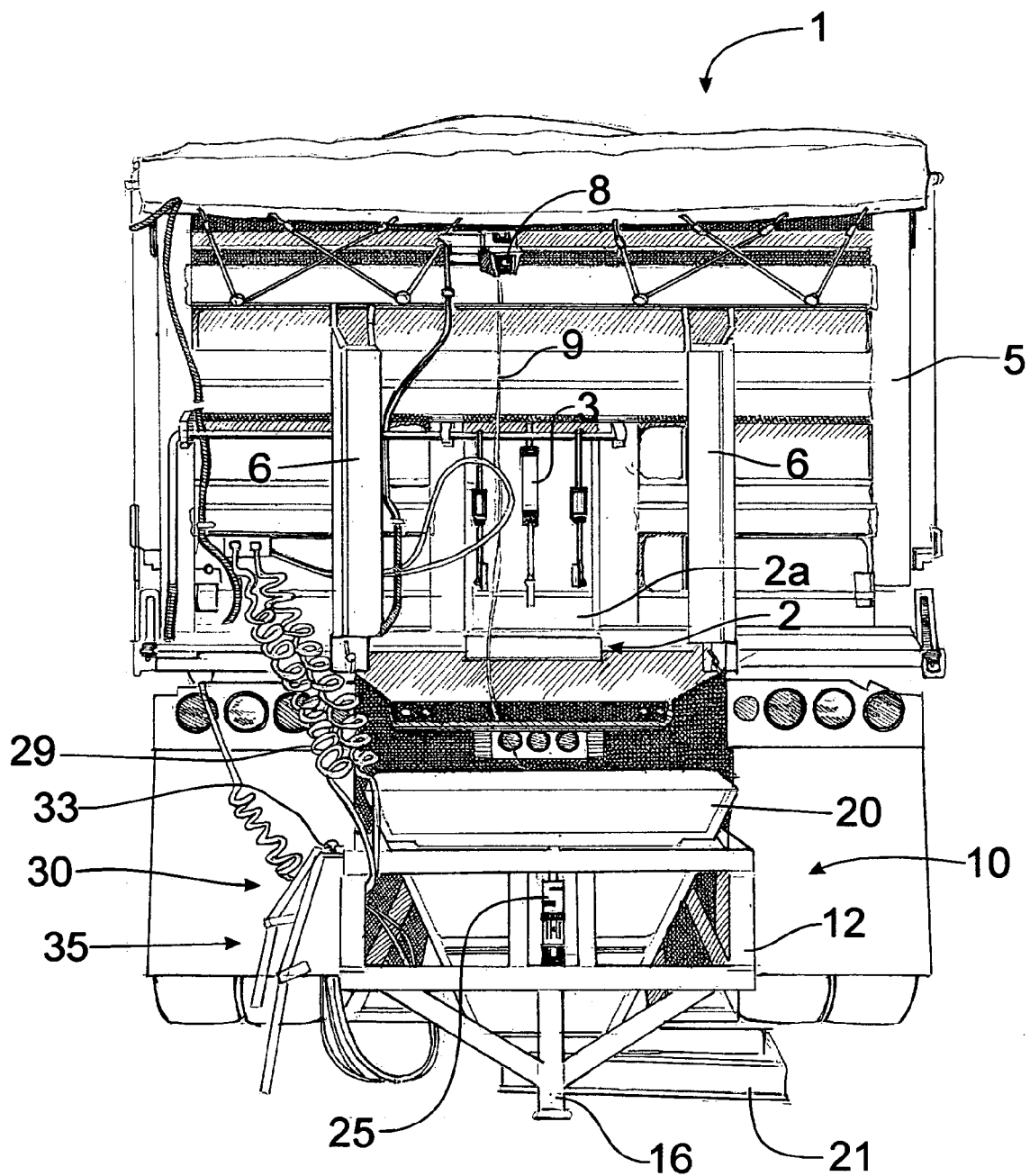
FIG. 4 is a rear elevational view of the delivery truck shown in FIG. 3.
Figure 5:
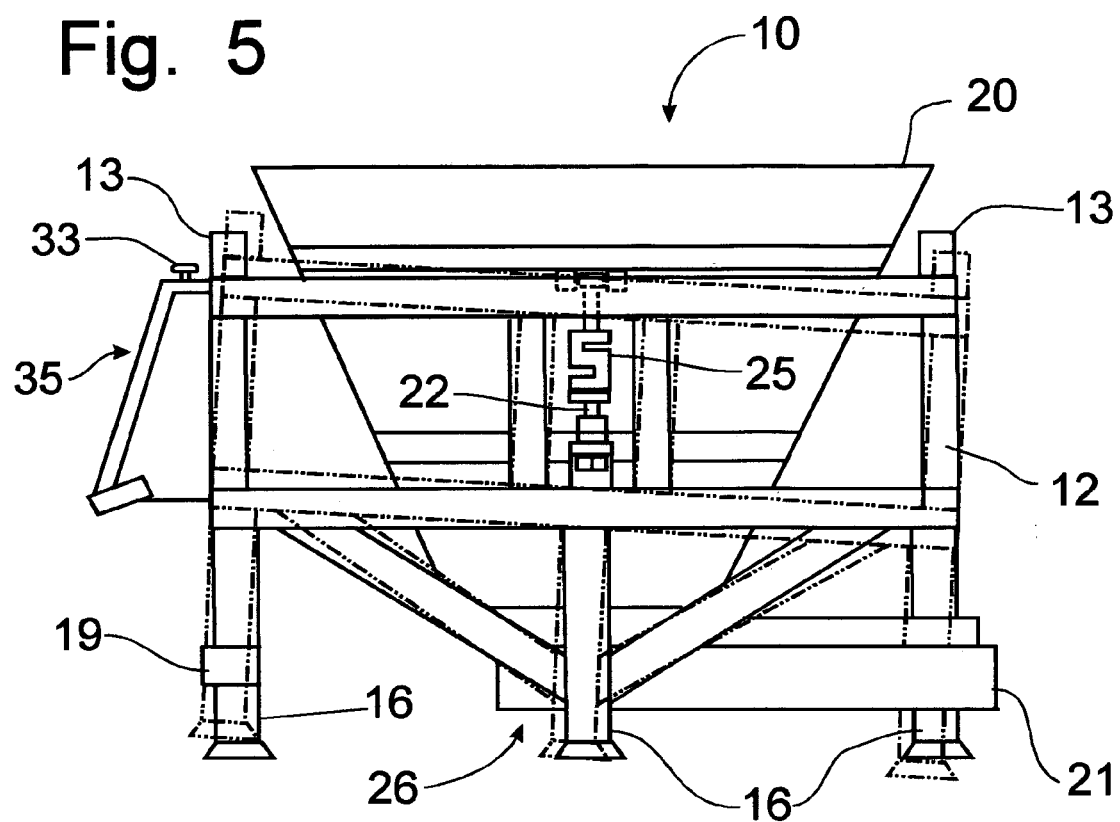
FIG. 5 is an enlarged rear elevational view of the scale mechanism oriented on a level ground surface, the phantom lines indicating the relative position of the frame apparatus when oriented on non-level ground surfaces with the hopper seeking a level orientation.
Figure 6:
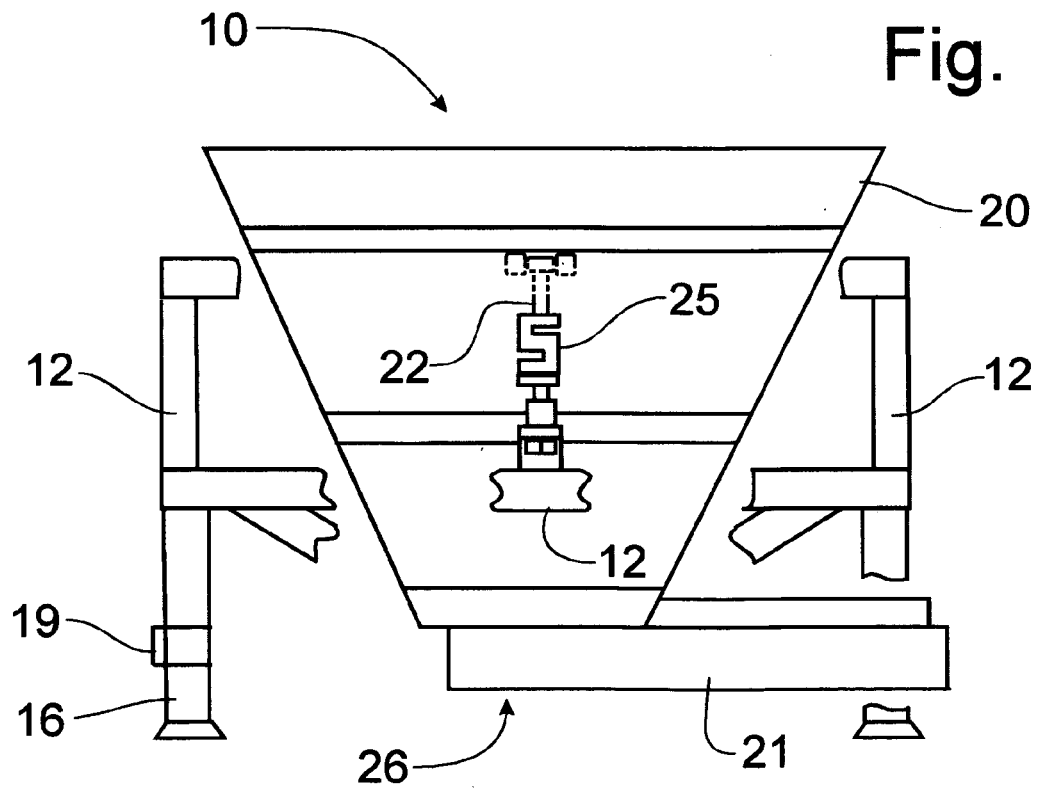
FIG. 6 is a rear elevational view of the scale mechanism depicted in FIG. 3, with portions of the frame apparatus being broken away to better shown the elevational view of the hopper.

Movement of the scale mechanism 10 between the transport position depicted in FIG. 2 and the operative position depicted in FIGS. 3 and 4 is accomplished via the operation of the electric winch 8. When the scale mechanism 10 is desired to be moved from the operative position to the transport position, the operator attaches the free end of the cable 9 to the support member 14, assuming that the cable 9 had been disconnected from the frame apparatus 12 when the scale mechanism 10 had been lowered into the operative position. The winch 8 is operated to wind the cable 9 onto the winch 8 drawing the frame apparatus 12 vertically toward the winch 8. Since the weight of the scale mechanism 10 is being carried by the winch 8, the operator can easily guide the hook members 13 into engagement with the anti-friction surfaces 7. The hook members 13 slide over the anti-friction surfaces 7 on the rear surface of the channels 6 until hooking into the tops of the channels where the weight of the scale mechanism 10 can be supported. The bottom portions of the frame apparatus 12 can then be attached by click pins (not shown) to connect the lower attachment members 19 to the tailgate 5, thus preventing the frame apparatus from becoming dislodged from the tailgate 5 during transport over the roads.

Lowering the scale mechanism 10 from the transport position depicted in FIG. 2 to the operative position depicted in FIGS. 3 and 4 is accomplished by the reversal of the procedure described above. The lower attachment members 19 of the frame apparatus 12 are disconnected from the tailgate 5 and the winch 8 is operated to lift the hook members 13 out of the channels 6 and then the winch 8 is reversed to lower the frame apparatus 12 with the hook members 13 gliding over the anti-friction surfaces 7 until the frame apparatus 12 is lowered to the surface of the ground rearwardly of the truck 1. While the weight of the scale mechanism 10 is supported on the winch 8 the position of the frame apparatus 12 can be pushed slightly either transversely or longitudinally relative to the tailgate 5 to locate to the scale mechanism 10 over the storage facility of the customer for discharge of salt thereto.

Figure 9:
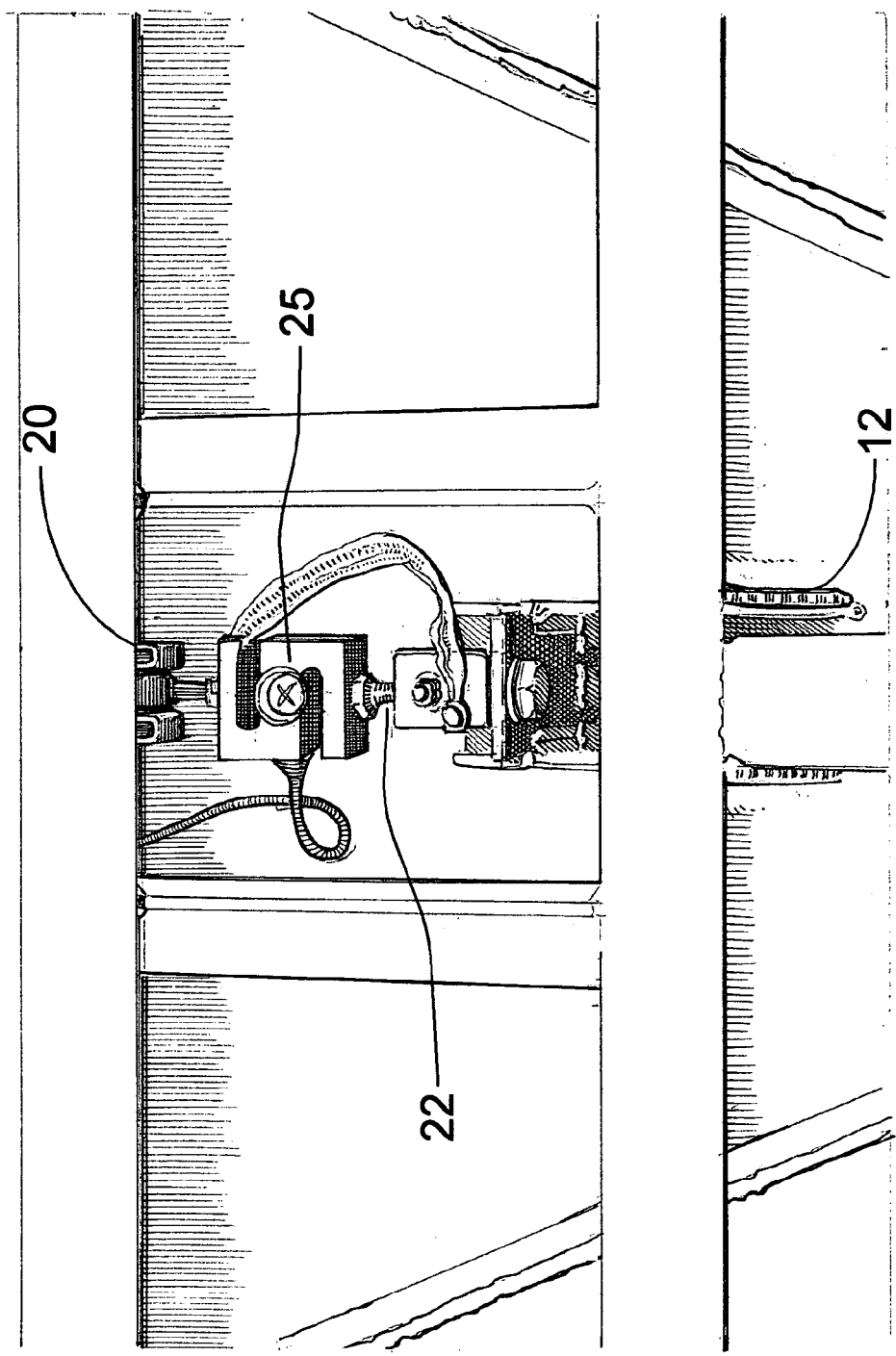
FIG. 9 is an enlarged detail view showing the pivotal support of the hopper from the frame apparatus at the support members containing the weigh cell.

The hopper 20 of the scale mechanism 10 is connected to the frame mechanism 12 by preferably three support pins 22 that are pivotally engaged with the sides of the hopper and are rigidly mounted on the frame apparatus 12, as is best seen in FIG. 9. Alternatively, the support pins 22 could be pivotally supported from the frame apparatus 12 and rigidly connected to the sides of the hopper 20. This mounting arrangement permits transverse pivotal movement of the hopper 20 relative to the frame apparatus 12. Thus, if the frame apparatus 12 is rested on a ground surface that is not level, the hopper 20 will swing into a level orientation by gravity due to the pivotal movement of the hopper 20 relative to the frame mechanism 12. Each of the support pins 22 supporting the hopper 20 contains a weigh cell 25 connected to the computer system 30 by conventional wiring. Accordingly, all of the weight of the hopper 20 is registered by the three weigh cells 25 in a uniform manner.

Figure 10:
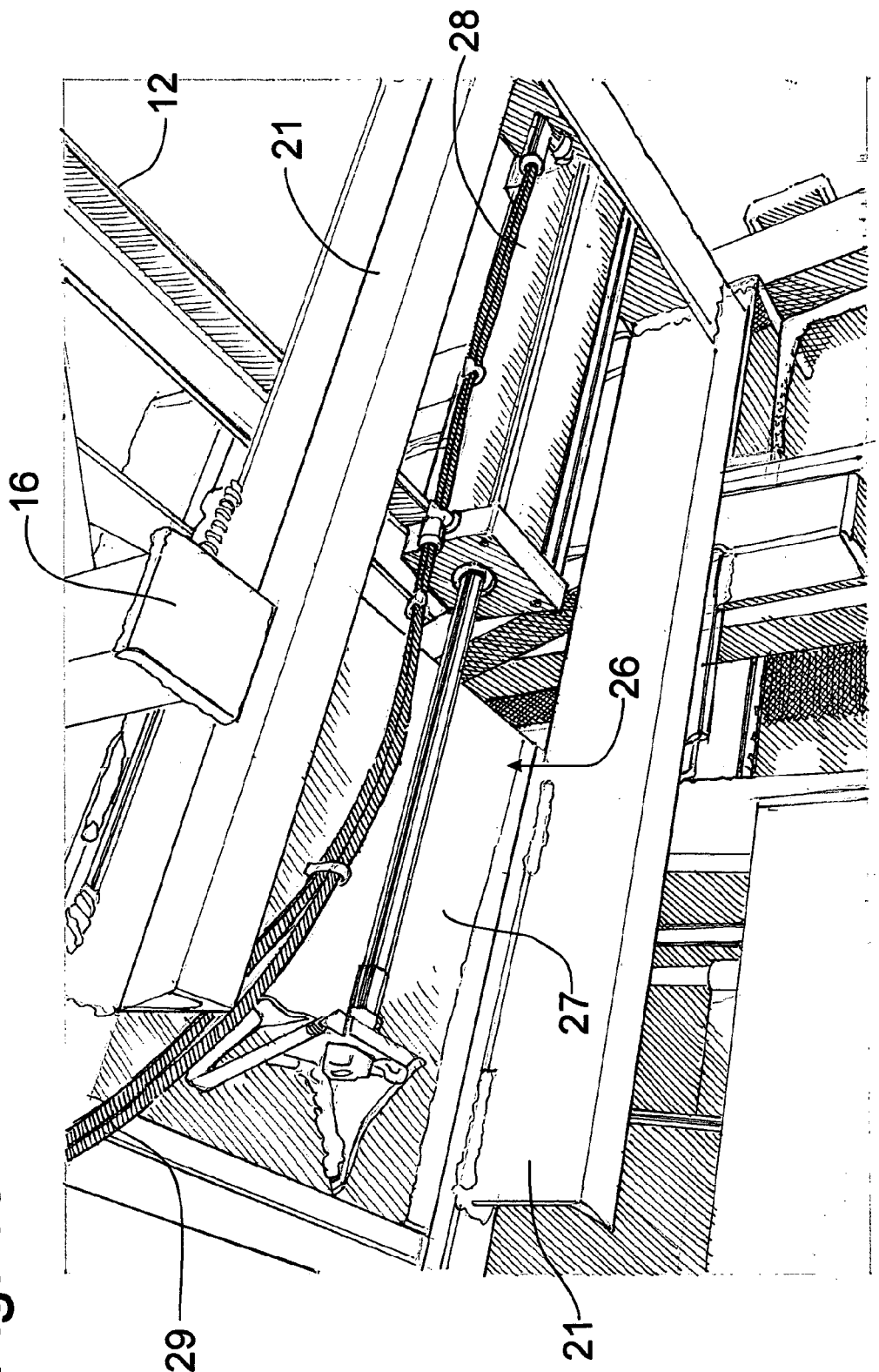
FIG. 10 is a bottom perspective view of a portion of the scale mechanism depicted in FIG. 5 to show the air cylinder controlled discharge gate.

The bottom of the hopper 20, as can be seen best in FIG. 10, funnels into a discharge opening 26 that is closable by a discharge gate 27 slidably supported in a slide frame 21 that is mounted on the hopper 20 structure to permit movement of the discharge gate 27 between a closed position and an opened position. The movement of the discharge gate 27 is controlled by an air cylinder 28 connected through hoses 29 to a source of pressurized air carried by the truck 1. When the discharge gate 27 is closed, salt (or the loose material being dispensed) is accumulated in the hopper 20 until filled appropriately and weighed, following which the discharge gate 27 is moved by the air cylinder 28 into the opened position and the weighed contents of the hopper 20 are dumped through the discharge opening 26 into the storage facility of the customer.

Preferably, the frame apparatus 12 has three ground support legs 16 to provide a stable support of the frame apparatus 12 on the ground surface with all of the support legs 16 sharing the support of the weight of the scale mechanism 10 and contents thereof over the ground. Positioning of the frame apparatus 12 will preferably be oriented by the operator during the lowering of the scale mechanism 10 from the transport position to position the frame apparatus so that the transverse pivotal movement of the hopper 20 will effect a leveling of the hopper 20.

The tailgate 5 is conventionally provided with the a delivery chute 2 at a lowermost central portion of the tailgate 5 so as to be in flow communication with the loose material forming the contents of the truck bed. The delivery chute 2 forms an opening through which the loose material in the truck bed can flow for delivery externally of the truck 1. The flow of loose material through this delivery opening is controlled by a delivery gate 2a movable between a closed and open positions by an air cylinder 3 connected to the source of pressurized air carried by the delivery truck 1 by hoses 4.

The scale mechanism 10 includes a computer system 30 carried by the frame apparatus 12 that performs a number of functions. The computer 30 is operatively connected to an electric over air control apparatus 35, including relays and valves for controlling the operation of the scale mechanism 10 and air cylinders 3, 28, which are operatively associated with the air hoses 4, 29, as will be described in greater detail below. Electrical power for operation of the computer 30 preferably comes from the delivery truck 1 electrical system, but could be self-contained by battery in a known manner. The computer system 30 is electronically associated with the weigh cells 25 to receive the output signal therefrom associated with the weigh of the hopper 20 and contents thereof registered with the respective weigh cells 25. As a result, the weight of the hopper contents, with the known weight of the hopper 20 being deducted therefrom, can be displayed on the computer screen 32.

Once booted-up and placed into operative mode, the computer system 30 controls the operation of the air cylinders 3, 28 through the control system 35 for the opening and closing of the delivery gate 2a and the discharge gate 27. By coordinating the operation of the air cylinders 3, 28, the discharge opening 26 of hopper 20 can be closed to retain loose material within the hopper 20 while the delivery gate is opened to allow loose material to flow into the hopper 20 until stopped by the closing of the delivery gate 2a. The computer 30 will keep both gates 2a, 27 closed while the weigh cells stabilize, which typically takes a few seconds, whereupon the computer 30 will register the accumulated weight of the loose material before opening the discharge gate 27 to discharge the weighed loose material into the customer's storage facility.

Figure 11:
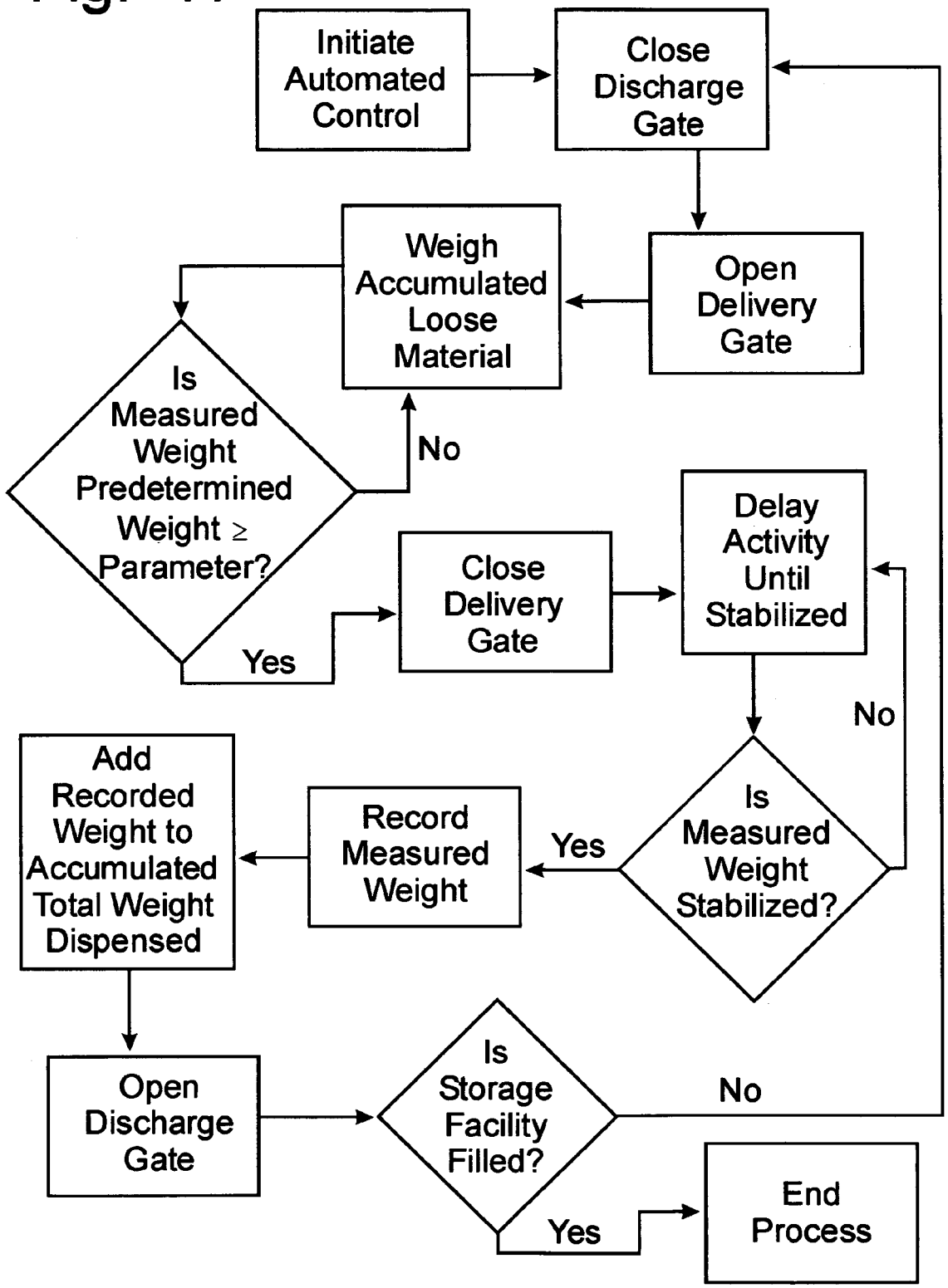
FIG. 11 is a process flow diagram representing the automated operation of the computer-controlled scale mechanism to dispense loose material from the truck into the customer's storage facility.

In the preferable mode of operation as is represented in the logic flow diagram of FIG. 11, the operator lowers the scale mechanism 10 from its transport position to an operative position over the access opening of the customer's storage facility. The computer system 30 is booted-up and the hopper and all operative memory registers are zeroed to begin the dispensing operation. The operator pushes the "start" button to initiate automated operation of the scale mechanism 10. The computer 30 first closes the discharge gate 27 by appropriately manipulating the operation of the air cylinder 28 and then opening the delivery chute 2 by manipulating the air cylinder 3. The loose material, such as loose salt, will flow through the opened delivery chute 2 and be received within the hopper 20. The computer senses through the operation of the weigh cells 25 the dispensing of a predetermined amount of loose salt into the hopper 20, such as for example a weight of 350 pounds of salt. When the predetermined amount of salt has been registered with the computer 30, the computer 30 automatically closes the delivery gate 2a and waits until the weigh cells stabilize so that the final weight of the dispensed salt is recorded, which due to the continual flow of loose material into the hopper 20 may now be in the range of 360 to 380 pounds.

Once the final weight has been identified, the computer 30 stores the value in a register in which the accumulated total is saved. The computer 30 then opens the discharge gate 27 through operation of the air cylinder 28 to discharge all of the accumulated salt within the funneled hopper 20 through the access opening into the customer's storage facility. When the tare weight of the hopper 20 returns to zero, the computer 30 closes the discharge gate 27 and re-opens the delivery gate 2a to re-start the dispensing process, as is described above. This process is automatically repeated until the operator notices by observing the level of salt in the storage facility through the access opening that the storage facility is almost filled, whereupon, the operator pushes the "start" button to stop the automated process. A partial filing of the hopper 20 may be accomplished manually to "top off" the storage facility, with the accumulated dispensed weight being added to the stored total.

This automated operation of the scale mechanism 10 can be utilized to dispense over 1000 pounds of salt from the delivery truck 1 to the customer's storage facility per minute of operation. Accordingly, the weighing operation is not only accurate, due to the leveling of the hopper 20 and the electronic weigh cells 25, but also the dispensing of loose salt is accomplished quickly and easily. The total weight of the salt dispensed is stored in the computer 30 and could be transmitted to the home office for immediate billing for the salt delivery. After the computer 30 is shut down, the scale mechanism 10 can be returned to the transport position, as described above, and the truck can continue to the next location for dispensing salt to the next customer.

Alternative operation of the scale mechanism 10 can be effected. For example, the dispensing of the salt can be substantially manually accomplished with the weight of each dispensed hopper of salt accumulated in a register as identified above. Furthermore, the automated process does not have to utilize a predetermined accumulated weight of loose salt to trigger the closing of the delivery gate 2a, as sensors (not shown) could be utilized to ascertain a certain level of accumulated loose salt within the hopper 20 in order to stop the delivery of loose salt into the hopper 20. Alternatively, the scale mechanism 10 could be used to deliver a predetermined total quantity of salt into the storage facility with each incremental delivery from the hopper 20 being deducted from the predetermined total weight before the operation of the scale mechanism 10 is terminated.

The invention of this application has been described above both generically and with regard to specific embodiments. Although the invention has been set forth in what is believed to be the preferred embodiments, a wide variety of alternatives known to those of skill in the art can be selected within the generic disclosure. For example, the use of air cylinders 3, 28 could be replaced by hydraulic cylinders coupled to a hydraulic system supported and operated through the truck 1. The invention is not otherwise limited, except for the recitation of the claims set forth below.

Having thus described the invention, what is claimed is:

1. A scale mechanism for mounting on a delivery truck for carrying supplies of loose material to be dispensed therefrom, said truck having a delivery chute through which said loose material is dispensed, said delivery chute being selectively controlled by a movable delivery gate, comprising:
    a frame apparatus for supporting the scale mechanism, said frame apparatus being movable from an elevated transport position mounted on said delivery truck to an operative position spaced vertically below said elevated transport position;
    a hopper pivotally supported by at least two supports pivotally mounted on the frame apparatus and being selectively positionable to receive loose material from said delivery chute, said hopper having a discharge opening through which the contents of the hopper can be discharged selectively;
    weigh cells connected to said supports to be disposed between the frame apparatus and the hopper so as to weigh the hopper and the contents thereof;
    a discharge gate movably mounted on said hopper to selectively open and close said discharge opening; and
    a computer system operatively connected to said weigh cells to record the weight of material within the hopper registered thereby, said computer system also being operable to control the movement of said discharge gate and said delivery gate to control the dispensing and discharge of loose material into and out of said hopper.

2. The scale mechanism of claim 1 wherein said frame apparatus includes attachment members for detachable mounting to said truck when said scale mechanism is placed into said elevated transport position supported on said truck.

3. The scale mechanism of claim 2 wherein said frame apparatus can be connected to a winch carried by said truck to effect the vertical movement of said scale mechanism between said vertical transport position supported on said truck and said lowered operative position wherein said frame apparatus supports said scale mechanism on the ground.

4. The scale mechanism of claim 3 wherein said truck includes a tailgate in which said delivery chute is disposed, said tailgate including a pair of transversely spaced channels engageable with said frame apparatus to support said scale mechanism in said transport position.

5. The scale mechanism of claim 4 wherein said frame apparatus includes a pair of transversely disposed hook members oriented for engagement with said channels.

6. The scale mechanism of claim 1 wherein said delivery gate and said discharge gate are operatively connected to an air cylinder powered from a source of pressurized air to effect selective movement of the respective said gate.

7. The scale mechanism of claim 1 wherein said computer system is operable in an automated mode in which said discharge gate is closed and said delivery gate is opened until a predetermined weight of loose material is received within said hopper, whereupon said delivery gate is closed automatically by said computer system to effect a final weighing of the loose material accumulated in said hopper.

8. The scale mechanism of claim 7 wherein said automated mode of said computer system is operable to automatically open said discharge gate after the weight of said accumulated loose material has been recorded to discharge the loose material from said hopper, said computer being operable to automatically close said discharge gate and open said delivery gate after the accumulated loose material has been discharged from said hopper.

9. A method of dispensing loose salt to a customer's storage facility from a delivery truck comprising the steps of:
    positioning a scale mechanism from a transport position supported on said truck to a position on the ground over said storage facility;
    activating a computer system on said scale mechanism, said computer system being operable to record a weight parameter of said loose salt in a hopper forming a part of said scale mechanism;
    closing a discharge gate on said hopper;
    opening a delivery gate on said truck to dispense loose salt therefrom into said hopper;
    accumulating a quantity of loose salt in said hopper;
    closing said delivery gate;
    recording said weight parameter of said quantity of loose salt; and
    opening said discharge gate to discharge said quantity of loose salt into said storage facility.

10. The method of claim 9 wherein said steps of closing, and opening said delivery and discharge gates are automatically effected by said computer system.

11. The method of claim 10 wherein said accumulating step includes the step of:
    dispensing said loose salt from said delivery truck into said hopper until the weight parameter of the loose salt accumulated in said hopper has reached a predetermined value, following which said computer system effects said step of closing said delivery gate.

12. The method of claim 11 wherein said steps of opening and closing said delivery and discharge gates are effected through operation of an air cylinder connected to each of said delivery and discharge gates.

13. The method of claim 12 wherein said steps of closing said discharge gate, opening said delivery gate, accumulating said quantity of loose salt in said hopper, closing said delivery gate, recording said weight parameter of said quantity of loose salt, and opening said discharge gate to discharge said quantity of loose salt are repeated cyclically until a desired amount of loose salt has been placed into said storage facility.

14. The method of claim 13 further comprising the step of returning said scale mechanism to said transport position on said delivery truck, said steps of positioning said scale mechanism and returning said scale mechanism being accomplished with a winch mounted on said delivery truck to effect a corresponding raising and lowering of said scale mechanism.

15. The method of claim 10 further comprising the step of:
    pivoting said hopper to a level orientation when a frame apparatus supporting said hopper is positioned on non-level ground.

16. A scale mechanism mounted on a truck having a delivery chute for the discharge of loose material from said truck, comprising:
    a frame apparatus for supporting said scale mechanism on a surface, said frame apparatus being detachable from said truck and selectively movable from an elevated transport position mounted on said truck to a lowered operative position;

a hopper pivotally supported on said frame apparatus by at least two support members such that said hopper is movable relative to said frame apparatus to seek a level orientation when said frame apparatus is supported on a non-level surface, said hopper being operable to receive a quantity of loose material from said delivery chute when said frame apparatus is in said lowered operative position to place said hopper in flow communication with said delivery chute to receive said loose material therefrom, said hopper having a discharge opening for the discharge of said loose material out of said hopper;

a discharge gate mounted on said hopper for movement between an open position and a closed position, said discharge gate controlling the accumulation of said loose material within said hopper;

a first actuator operatively associated with said discharge gate to control the movement thereof;

a second actuator associated with said delivery chute to control the flow of said loose material from said delivery chute into said hopper;

a weigh cell associated with each said support member to register a weight parameter of said hopper and any accumulated loose material therein; and a computer system operatively connected to said weigh cells to identify said weight parameter, said computer system being operably connected to said first actuator to permit an automated control thereof in response to predetermined criteria stored in said computer system, said computer system also being operably connected to said second actuator to permit automated control thereof in relation to the automated control of said first actuator.

17. The scale mechanism of claim 16 wherein said computer system is operable to provide an electronic indication of said weight parameter and to permit a storing thereof in a memory register.

18. The scale mechanism of claim 17 wherein said predetermined criteria is a specified weight parameter, said computer system permitting the accumulation of said loose material into said hopper from said delivery chute until said specified weight parameter has been reached, whereupon said computer system manipulates said second actuator to close said delivery chute, records the weight parameter of said accumulated loose material and then opens said discharge gate to effect a discharge of said accumulated loose material from said hopper.

19. The scale mechanism of claim 18 wherein said frame apparatus is formed with attachment members to permit a selective mounting of said frame apparatus to said truck in said elevated transport position.

20. The scale mechanism of claim 19 wherein said frame apparatus is detachably connectable to a winch mounted on said truck to effect a positioning of said frame apparatus between said elevated transport position mounted on said truck and said lowered operative position supported on said surface.

21. The scale mechanism of claim 20 wherein said attachment members include a pair of transversely spaced hook members engageable with corresponding channels on said truck.

* * * * *